(12) United States Patent
Pfeifer et al.

(10) Patent No.: US 11,590,926 B2
(45) Date of Patent: Feb. 28, 2023

(54) DRIVE ARRANGEMENT FOR A FLAP OF A MOTOR VEHICLE

(71) Applicant: Brose Fahrzeugteile SE & Co. Kommanditgesellschaft, Bamberg, Bamberg (DE)

(72) Inventors: Sebastian Pfeifer, Strullendorf (DE); Matthias Rauscher, Frankenblick (DE); Rocco Di Benedetto, Coburg (DE)

(73) Assignee: Brose Fahrzeugteile SE & Co. Kommanditgesellschaft, Bamberg

( * ) Notice: Subject to any disclaimer, the term of this patent is extended or adjusted under 35 U.S.C. 154(b) by 0 days.

(21) Appl. No.: 17/286,279

(22) PCT Filed: Oct. 16, 2019

(86) PCT No.: PCT/EP2019/078034
§ 371 (c)(1),
(2) Date: Apr. 16, 2021

(87) PCT Pub. No.: WO2020/079044
PCT Pub. Date: Apr. 23, 2020

(65) Prior Publication Data
US 2022/0118939 A1    Apr. 21, 2022

(30) Foreign Application Priority Data

Oct. 17, 2018   (DE) .................. 10 2018 125 800.3

(51) Int. Cl.
*B60R 21/38*   (2011.01)

(52) U.S. Cl.
CPC .................... *B60R 21/38* (2013.01)

(58) Field of Classification Search
CPC ............... B60R 21/34; B60R 21/38
See application file for complete search history.

(56) References Cited

U.S. PATENT DOCUMENTS

| 7,374,008 B1* | 5/2008 | Neal ................ B60R 21/38 |
| | | 180/274 |
| 2008/0111334 A1* | 5/2008 | Inoue ................ B60G 17/06 |
| | | 180/274 |

(Continued)

FOREIGN PATENT DOCUMENTS

| DE | 19922454 A1 | 11/2000 |
| DE | 10323118 A1 | 12/2004 |

(Continued)

*Primary Examiner* — Barry Gooden, Jr.
(74) *Attorney, Agent, or Firm* — Dickinson Wright PLLC (57) ABSTRACT

A drive arrangement for adjusting a front hood of a motor vehicle including a first drivetrain for producing a first drive movement between a flap-side drive connection and a body-side drive connection and when the first drivetrain is in a normal state the first drive movement opens the flap from a closed position to an open position. A second drivetrain for producing a second drive movement between a flap-side drive connection and a body-side drive connection to open the flap from the closed position to a collision position so that by means of the second drive movement of the second drive the first drivetrain changes from a normal state to a bypass state, in which a first strand component of the first drivetrain moves relative to a second strand component of the first drivetrain.

20 Claims, 4 Drawing Sheets

(56) References Cited

U.S. PATENT DOCUMENTS

| | | | | |
|---|---|---|---|---|
| 2015/0107930 A1* | 4/2015 | Kugler | ............... | E05F 15/60 |
| | | | | 180/274 |
| 2016/0144822 A1* | 5/2016 | Kim | ............... | B60R 21/34 |
| | | | | 16/222 |
| 2017/0036643 A1* | 2/2017 | Matsushima | .......... | B62D 25/10 |
| 2017/0203713 A1* | 7/2017 | Abe | ............... | B60R 21/38 |
| 2017/0327074 A1* | 11/2017 | Schabenberger | ....... | B60R 21/38 |
| 2020/0023806 A1* | 1/2020 | Sasaki | ............... | B60R 21/38 |
| 2020/0023807 A1* | 1/2020 | Narita | ............... | B60R 19/52 |
| 2020/0024870 A1* | 1/2020 | Sasaki | ............... | B62D 25/105 |
| 2021/0402953 A1* | 12/2021 | Polisetty | ............ | E05D 15/46 |

FOREIGN PATENT DOCUMENTS

| | | | | |
|---|---|---|---|---|
| DE | 10355444 | A1 | 6/2005 | |
| DE | 202008001247 | U1 | 6/2009 | |
| DE | 10043931 | B4 | 12/2015 | |
| DE | 102014013771 | A1 | 3/2016 | |
| DE | 102014015998 | A1 * | 5/2016 | ............ B60R 21/38 |
| DE | 102015201705 | A1 | 8/2016 | |
| DE | 102015014843 | A1 | 5/2017 | |
| EP | 1238893 | A1 | 9/2002 | |
| EP | 1375266 | A2 | 1/2004 | |
| WO | 2004108486 | A1 | 12/2004 | |
| WO | WO-2016021326 | A1 * | 2/2016 | ............ B60R 21/38 |
| WO | WO-2021259682 | A2 * | 12/2021 | ............ B60R 21/38 |

\* cited by examiner

DRIVE ARRANGEMENT FOR A FLAP OF A MOTOR VEHICLE

CROSS-REFERENCE TO RELATED APPLICATIONS

This application is the U.S. National Phase of PCT Application No. PCT/EP2019/078034 filed on Oct. 16, 2019, which claims priority to German Patent Application No. DE 10 2018 125 800.3, filed on Oct. 17, 2018, the disclosures of which are hereby incorporated in their entirety by reference herein.

TECHNICAL FIELD

The present disclosure relates to a drive arrangement for a flap of a motor vehicle.

BACKGROUND

A drive arrangement may be used in the context of the external force adjustment of any flap of a motor vehicle. Such a flap is in particular a front hood, for example an engine hood or trunk hood, which is arranged at the front of the vehicle. However, such a flap may also be a tailgate, a rear cover, a luggage compartment floor or even a door of a motor vehicle. To this extent, the term 'flap' is to be understood broadly in the present case.

SUMMARY

The present disclosure may be based on one or more objects such as configuring and developing the known drive arrangement in such a way that high crash safety is ensured with the simplest possible structure.

In a drive arrangement which permits both regular external force opening and collision-based, such as an abrupt adjustment as an active pedestrian protection, a consideration may be to provide an individual drivetrain with its own drive for each of the two functions. Thus, a first drivetrain is provided with a first drive in order to affect the regular opening of the flap, that is to say an opening of the flap from its closed position into its open position. The open position is a position of the flap in which the interior covered thereby, for example the front luggage compartment or engine compartment in the case of a front hood, is regularly accessible. As an example, the open position is the maximally opened position of the flap. For the second function, a separate, second drivetrain, different from the first drivetrain, is provided, which has an individual, second drive. The second drive permits particularly fast, such as abrupt, adjustment of the flap from the closed position into a collision position, in which the flap may include a different position than in its open position. As an example, the flap is also pivoted by the second drive into a different pivoted position than during regular opening by means of the first drive, which will be explained in more detail below. Thus, for each of the two aforementioned functions, namely the regular opening, on the one hand, and the opening in the event of a collision, on the other hand, an individual drivetrain and drive is provided, by which means each drivetrain can be configured optimally and may be reliable for its specific function. In this way, high crash safety can also be achieved with a simple construction of a drive arrangement.

The first drivetrain which may be used for the regular opening of the flap is transferred from its normal operating state (normal state), in which it effects the regular opening of the flap, into a bypass state, in which it does not or at least does not noticeably hamper an adjustment of the flap into its collision position. The first drivetrain is automatically moved into the bypass state by the drive movement of the second drive. Therefore, as soon as the second drive carries out the drive movement, which adjusts the flap from the closed position into the collision position, therefore involves the transfer of the first drivetrain into its bypass state, which means that the first drivetrain or the drive thereof cannot have a negative influence on the drive movement of the second drive. In this way, the crash safety can be increased further.

In one or more embodiments, a second drivetrain is provided, which has a second drive for producing a second drive movement between a flap-side drive connection and a body-side drive connection of the second drive. The second drive movement opens the flap from the closed position into a collision position, that by means of the second drive movement of the second drive, the first drivetrain is transferred from its normal state into a bypass state, in which a first strand component of the first drivetrain is displaced relative to a second strand component of the first drivetrain with respect to the normal state relative to the direction of the course of the first drivetrain, and that the first drive is a spindle drive.

In one or more embodiments, the first drive forms the first strand component or part of the first strand component, which is displaced when the first drivetrain is transferred from its normal state into the bypass state. As an example, by means of the second drive movement of the second drive, the first drive as a whole or as a unit within the first drivetrain is displaced from an operating position into a bypass position. In the bypass position, the drive components forming the first drive, such as its drive unit, thrust mechanism and drive connections, also have an operative drive connection. The first drive itself may be not divided. However, it is also conceivable that the first drive is divided into two component units by the second drive movement and, as a result, the first drivetrain is severed. One of the component units of the first drive, which then, for example, may include the drive unit with the drive motor and a possibly present intermediate mechanism and one of the drive connections, then forms the first strand component of the first drivetrain, whereas the remaining drive components of the first drive form the second strand component. In both cases, it may be preferable if the first drive is not separated completely from the flap, in order to avoid said drive being able to expand and produce a potential hazard.

According to another embodiment, the first drivetrain may include a coupling device with a coupling element and a connecting element. The coupling element is in any case axially fixedly connected to the flap-side or body-side drive connection of the first drive, wherein the connecting element connects the coupling element to the flap or body and, in particular, then transmits forces between the coupling element and the flap or body. As an example, the connecting element is configured such that it transmits forces in a direction orthogonal to the flap inner side or outer side. The connecting element can also form an axial guide for the coupling element, which is then movable therein, which will be explained further below.

In the normal state of the first drivetrain, the first strand section, such as the coupling element, is connected by a friction fit, form fit, integral fit and/or in a sprung manner, in each case based on the axial direction and/or opposite direction, to the second strand section, such as to the connecting element. When a limiting load is exceeded, this connection is detachable in order to transfer the first drivetrain from the normal state into the bypass state and such as to displace the first drive from its operating position into its bypass position. The limiting load may be at least 300 N, or at least 400 N, or at least 500 N. In the event of a maloperation (misuse case), when, for example, the flap is opened manually with a great deal of force by the user, this prevents the first drivetrain from already being transferred from the normal state into the bypass state. Following its displacement caused by exceeding the limiting load, the first strand section or the coupling element may be reset into its original position before the detachment of the connection. In this way, the user can, for example, himself drive the motor vehicle to the workshop following a relatively small collision.

The second drive may include a pyrotechnic actuator and/or a pre-tensioned spring, with which abrupt adjustment of the flap in the event of a collision is possible.

According to another embodiment, the second drive may include a higher adjustment speed than the first drive. In particular, the adjustment speed of the second drive is higher than an adjustment speed of the first drive, which is effected solely by an expanding helical compression spring of the first drive. As a result, the second drive moves the flap more rapidly than the first drive and in particular its helical compression spring is able. As a result, the first drive does not influence the function of the second drive.

According to a yet another embodiment, a flap arrangement of a motor vehicle having a flap, such as a front hood, and at least one drive arrangement is provided. In the flap arrangement according to this embodiment, the same advantages may be achieved as described above in conjunction.

According to yet another embodiment, a method for operating a drive arrangement is provided. The method may include, in the event of a collision, the second drive effects a displacement movement of the flap from the closed position in the direction of the collision position and may operate until in the collision position, before the first drive transmits a drive force to the flap.

BRIEF DESCRIPTION OF THE DRAWINGS

In the following text, the invention will be explained in more detail by using a drawing which illustrates merely exemplary embodiments. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known drive arrangement is described in DE 10 2015 201 705 A1, and includes a front hood of a motor vehicle provided with active pedestrian protection. This can reduce the risk of injury to a pedestrian in the event of a collision between the vehicle and the pedestrian. Here, a collision or impending collision is detected by sensors and the front hood is raised abruptly from its closed position via a drive on its side facing the windshield of the motor vehicle. In this raised and thus partially opened position, further referred to as the collision position, the risk of injury is lower than in the closed position, since the front hood is located at a greater distance from the components arranged under the front hood and the comparatively rigid body and is therefore more flexible. For the abrupt adjustment of the front hood from the closed position to the collision position, the drive has, for example, a pyrotechnic actuator, which unlocks a pre-tensioned pressure spring when activated in the event of a collision, which then in turn moves the front hood into the collision position.

In the known drive arrangement, it is particularly advantageous that after an abrupt adjustment, the front hood can also be reset into its closed position again by an external force. This is achieved in that the same drive is used for the abrupt adjustment in the event of a collision with which the front hood can also be opened regularly by an external force, for example in order to be able to carry out maintenance work in the engine compartment. A drive for the regular external force and automatic opening of a front hood usually also permits corresponding external force closure of the front hood. In the known drive arrangement, this function is at the same time also used to reset the front hood following an abrupt adjustment. However, this drive arrangement is comparatively complexly constructed.

Figure 1:
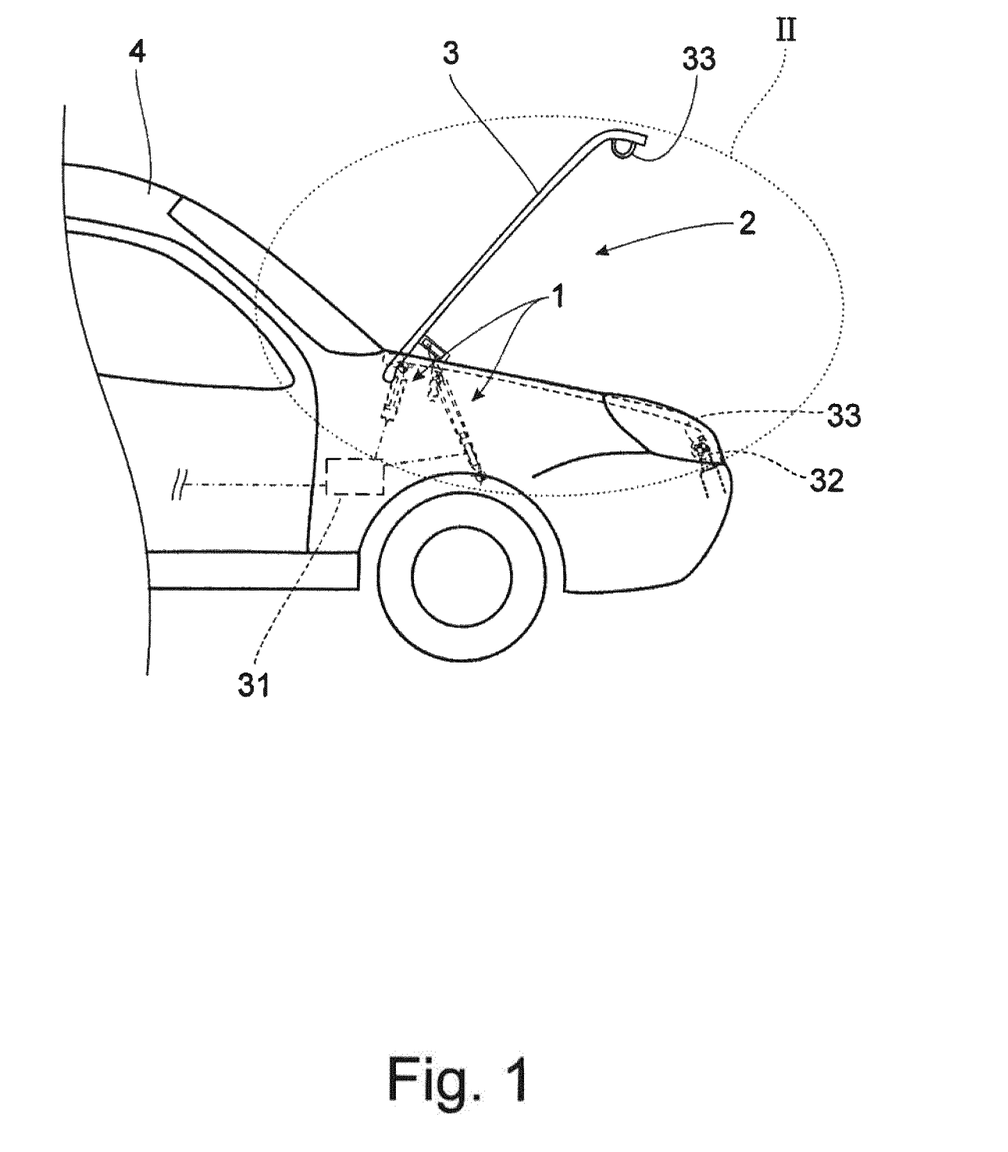
FIG. 1 shows the front area of a motor vehicle having a drive arrangement according to one or more embodiments for the flap arrangement there.

The drive arrangement 1, according to one or more embodiments, is associated with a flap arrangement 2, a front hood arrangement by way of example in FIG. 1, which in turn is equipped with a flap 3, here a front hood. The flap arrangement 2 is associated with a motor vehicle 4.

As mentioned at the beginning, the flap 3 can also be another flap 3 of a motor vehicle 4, in particular an engine hood, but also a tailgate or the like. All the explanations apply in a corresponding way to other flaps.

Figure 2:
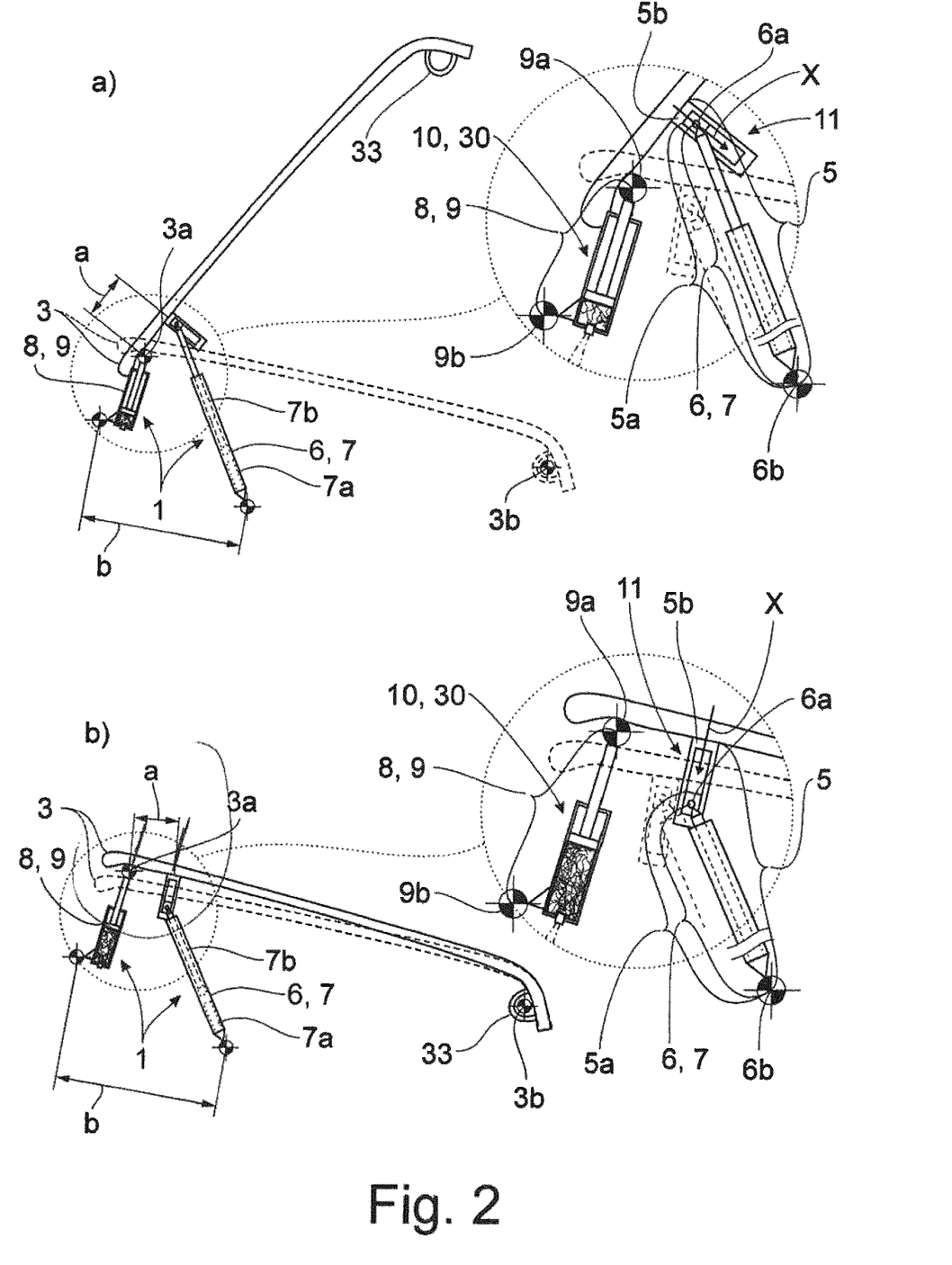
FIG. 2 shows the flap arrangement according to FIG. 1 *a*) in regular operation and *b*) in the event of a collision.

FIG. 2 shows that, in any case to open and here also to close the flap 3 in regular operation, a first drivetrain 5 is provided, which has a first drive 6, configured as a spindle drive 7, for producing a first, linear drive movement between a flap-side drive connection 6a and a body-side drive connection 6b of the first drive 6. FIGS. 1 and 2a) show the first drivetrain 5 in a state in which the latter ensures a normal opening and closing operation of the flap 3. This state of the first drivetrain 5 will be designated as the normal state below. In the normal state, the first linear drive movement of the spindle drive 7 opens the flap 3 from a closed position (illustrated dashed in FIG. 2a)) into an open position (illustrated by a continuous line in FIG. 2a)).

In an intrinsically usual way, the spindle drive 7 may include an electric drive unit 7a with an electric drive motor and an intermediate mechanism connected downstream of the drive motor. Connected downstream of the drive unit 7a in drive terms overall is a spindle unit 7b, which is formed as a spindle-spindle nut mechanism. The spindle unit 7b has a spindle nut and a spindle, which mesh with each other to produce linear drive movements. The linear drive movements are led out via the flap-side drive connection 6a and the body-side drive connection 6*b*, by which means the flap 3 is accordingly adjusted between its closed position and its open position.

It is then important that, in the drive arrangement 1 according to the invention, in addition to the first drivetrain 5, a second drivetrain 8, which has an individual drive 9, is also provided. This second drive 9, which may have a pyrotechnic actuator 10, is set up to produce a second, here such as linear, drive movement between an individual flap-side drive connection 9*a* and an individual body-side drive connection 9*b*. The second drive movement is not used here for the regular opening of the flap 3 from its closed position into its open position but for an opening of the flap 3 from the closed position (illustrated dashed in FIG. 2*b*)) into a collision position (illustrated by a continuous line in FIG. 2*b*)), which is different from the open position. The second drive movement may lead to a different movement sequence of the flap 3 than the first drive movement, which becomes clear when FIGS. 2*a*) and 2*b*) are compared and will be described further below. Additionally or alternatively, the second drive movement can also differ from the first drive movement by the speed of movement, which will likewise be described further below.

Furthermore, in the drive arrangement 1 according to one or more embodiments, it is important that by means of the second drive movement of the second drive 9, the first drivetrain 5 is transferred from its normal state, in which the latter effects the regular opening of the flap 3 from the closed position into the open position, into a bypass state, in which a first strand component 5*a* of the first drivetrain 5 is displaced relative to a second strand component 5*b* of the first drivetrain 5 with respect to the normal state relative to the direction of the course of the first drivetrain 5. In this bypass state of the first drivetrain 5, the latter can be severed and can therefore not transmit any load which could open the flap 3. However, it is also conceivable that the first drivetrain 5 is not severed and merely has a different position of its strand components relative to one another and/or a different course and, accordingly, different movement kinematics.

Because the first drivetrain 5 is transferred into a bypass state, it is ensured that the first drivetrain 5 does not have a detrimental influence on the function of the second drivetrain 8 and, in particular, its drive movement. In this way, the second drive movement of the second drive 9 can move the flap 3 abruptly into its collision position in the event of a collision, without the risk that the first drivetrain will make this adjustment movement of the flap 3 more difficult or even block the same. In addition to a simple design structure, in which each of the two drivetrains 5, 8 and each of the drives 6, 9 can be configured optimally for its respective function, increased crash safety is also achieved here.

As an example, according to a first variant the first drive 6 as a whole forms a part of the first strand component 5*a* of the first drivetrain 5 or even forms the entire first strand component 5*a*. The second strand component 5*b* of the first drivetrain 5 may be formed by part of a coupling device 11, which is set up to couple the first drive 6 to the flap 3. In this way, when the first drivetrain 5 is transferred from its normal state into its bypass state, the first drive 6 is displaced from an operating position into a bypass position by the second drive movement of the second drive 9 within the first drivetrain 5. In the operating position of the first drive 6, the first drivetrain 5 is in its normal state, whereas, in the bypass position of the first drive 6, the first drivetrain 5 is in its bypass state. Because the first drive 6 as a whole is displaced within the first drivetrain 5, in the bypass position of the first drive 6, the drive components forming the first drive 6, and the drive unit 7*a* and its components, the spindle unit 7*b* and its components and also the drive connections 6*a*, 6*b*, continue to be arranged relative to one another as in the operating position and/or continue to have an operative drive connection.

According to a second variant, not illustrated here, however, it is also conceivable to divide the first drive 6 into two component units by means of the second drive movement of the second drive 9 and, as a result, to sever the first drivetrain 5. In this case, the first component unit of the first drive 6 would form the first strand component 5*a*, and the other component unit would form the second strand component 5*b*. The one component unit which forms the first strand component 5*a* in this case may include at least the drive motor and the flap-side drive connection 6*a*, such as the entire drive unit 7*b* and the flap-side drive connection 6*a*. In this case, the other component unit then has the remaining drive elements, in particular the spindle unit 7*a* and the body-side drive connection 6*b*.

In one or more variants, the first drive 6 may not be detached completely from the flap 3, which is able to prevent the first drive 6 expanding abruptly, for example, as a result of a pre-tensioned compression spring therein, for example a helical compression spring, and as a result leading to a hazard. In the case in which the first drive 6 is divided into two component units, these can also still be connected to each other via a, for example, telescopic housing even after the division. Thus, for example, the one component unit can have a tubular housing part, which is fixed to the flap 3 via the flap-side drive connection 6*a*, and the respective other component unit can have a likewise tubular housing part, which is guided axially in the other tubular housing part and which is fixed to the body via the body-side drive connection 6*b*. In this way, despite dividing the first drive 6 into two component units, it is ensured that the two component units cannot move apart uncontrollably.

As an example, the coupling device 11 is configured such that when the first drive 6 is displaced from the operating position into the bypass position, said drive cannot expand uncontrollably. For this purpose, the coupling device 11 has a coupling element 12 and a connecting element 13. The coupling element 12 may be axially fixedly and for example, pivotably connected to the flap-side drive connection 6*a* of the first drive 6. In principle, however, it is also conceivable to arrange the coupling device 11 on the other side of the first drive 6, wherein the coupling element 12 would then be connected to the body-side drive connection 6*b*. The connecting element 13 is used to connect the coupling element 12 to the flap 3 and in particular to transmit forces between the coupling element 12 and the flap 3. Were the coupling device 11 to be arranged on the other side of the first drive 6, the connecting element 13 would be used to connect the coupling element 12 to the body and in particular to transmit forces between the coupling element 12 and the body. The coupling element 12 is connected to the connecting element 13, so that a drive movement produced by the first drive 6 can be transmitted from the coupling element 12 via the connecting element 13 to the flap 3.

The connecting element 13 may form the second strand component 5*b*. As a result of the second drive movement of the second drive 9, here the first drive 6 together with the coupling element 12 is displaced from the operating position into the bypass position of the first drive 6.

The connecting element 13 may be a guide extending in an axial direction X, in which the coupling element 12 is guided axially when the coupling element 12 is moved relative to the connecting element 13, as will be described below. The connecting element 13 is here axially fixedly and in particular rotationally fixedly connected to the flap 3. The connecting element 13 is aligned relative to the flap 3 such that in the case in which the coupling element 12 is moved axially in the connecting element 13, the movement of the coupling element 12 is directed orthogonally relative to the flap outer side or inner side. The first drive 6 is axially fixedly and in particular pivotably connected to the body of the motor vehicle 4, specifically via its body-side drive connection 6b. The connecting element 13 can as a result follow a movement of the flap 3 from the closed position into the open position and vice versa, and may also follow a movement of the flap 3 from the closed position into the collision position.

If the first drivetrain 5 is in its normal state, in which regular opening of the flap 3 from the closed position into the open position is possible, the coupling element 12 is connected to the connecting element 13 by a friction fit, form fit, integral fit and/or in a sprung manner to transmit forces between the coupling element 12 and the flap 3 in and/or counter to the axial direction X. This connection is automatically detached when a limiting load such as at least 300 N, or of at least 400 N, or at least 500 N, is exceeded.

Figure 3:
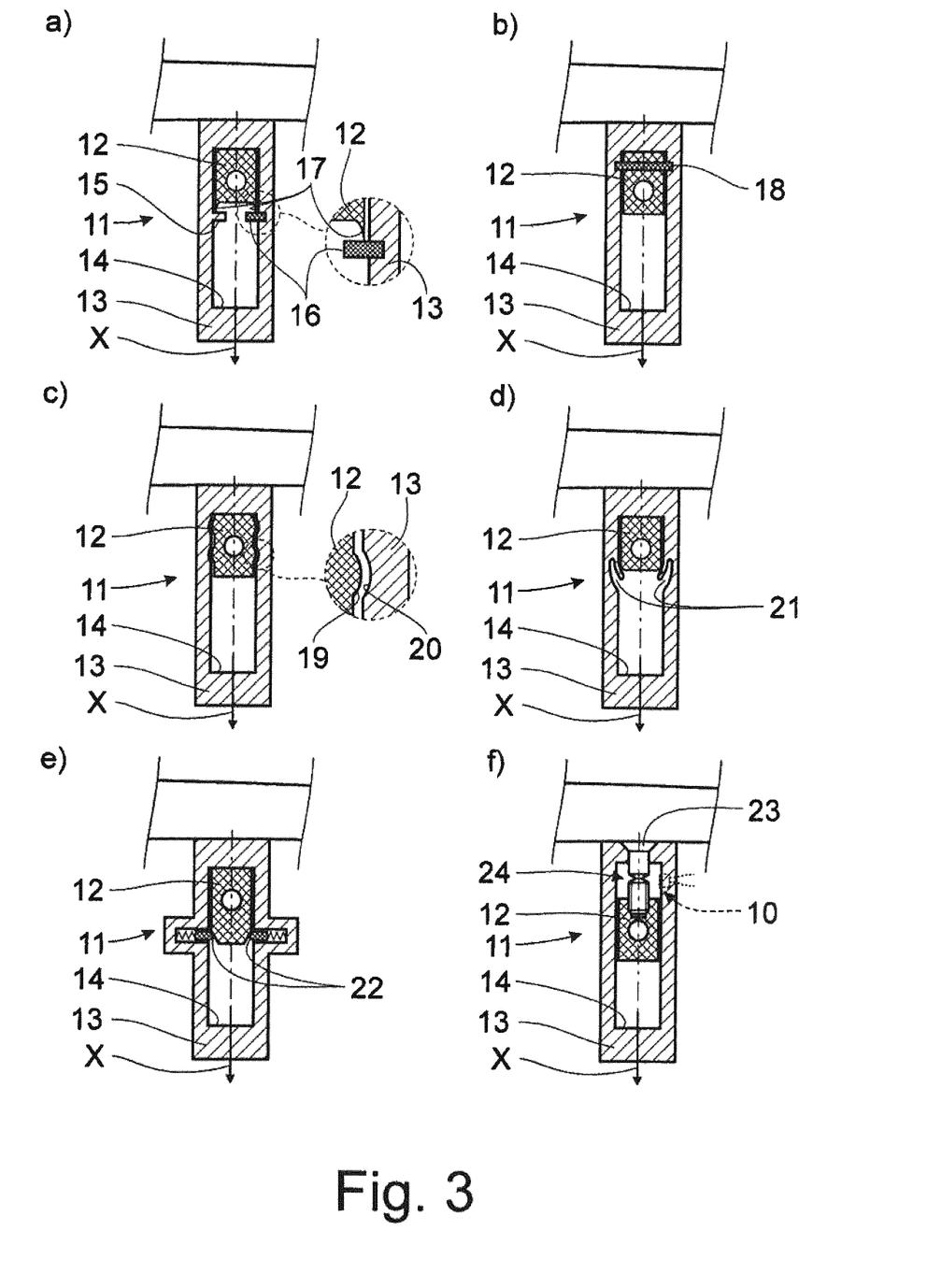
FIG. 3 shows various exemplary embodiments of a coupling device of a first drivetrain of the drive arrangement according to one or more embodiments.

Various exemplary embodiments of a coupling device 11 having such a detachable connection between the coupling element 12 and the connecting element 13 are illustrated in FIGS. 3a) to f) and 4a) to d). Until the limiting load is reached, the coupling element 12 has an operative drive connection to the connecting element 13, and can regularly transmit the first drive movement of the first drive 6 for opening the flap 3 from the closed position into the open position. If the limiting load is exceeded, the connection between the coupling element 12 and the connecting element 13 is detached, in order to transfer the first drivetrain from the normal state into the bypass state. In the process, the coupling element 12 is displaced within the connecting element 13 in the axial direction X from the upper position, illustrated in FIGS. 3 and 4, into a lower position as far as a lower stop 14 of the connecting element 13.

As an example, the coupling element 12 is mounted in the interior of the connecting element 13 and axially guided therein. In principle, the connecting element 13 can, however, also be configured such that the coupling element 12 is arranged on the outside of the connecting element 13 and is accordingly guided on the outside when the connection has been detached.

In any case, in the bypass state of the first drivetrain 5, the coupling element 12 is loosely mounted on or in the connecting element 13. Alternatively, it is also conceivable that, in the bypass state, the coupling element 12 once more makes an axially fixed connection to the connecting element 13, for example a friction-fitting and/or form-fitting connection.

Figure 4:
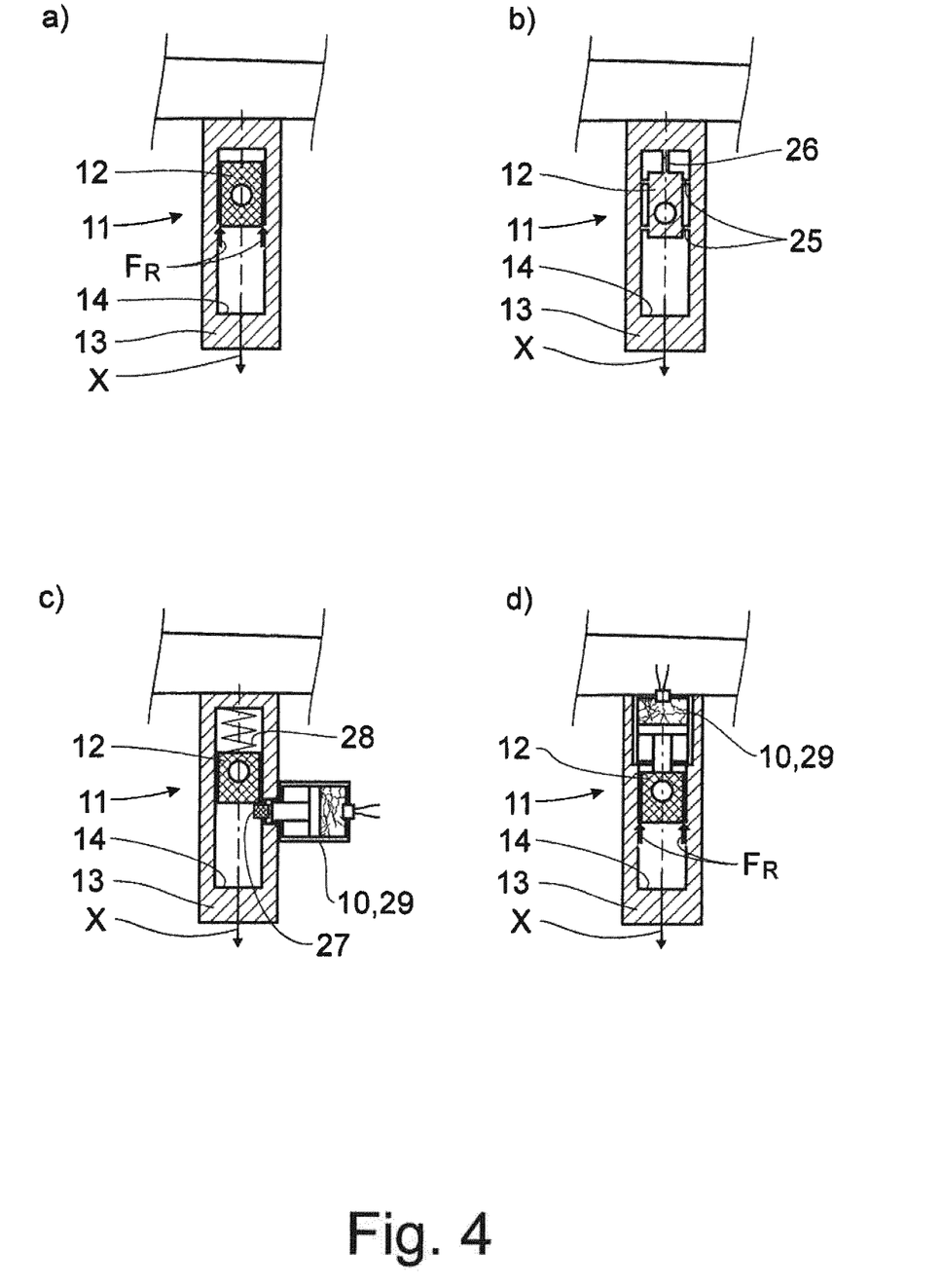
FIG. 4 shows further exemplary embodiments of a coupling device of a first drivetrain of the drive arrangement according to one or more embodiments.

In the following text, various exemplary embodiments will now be described by using FIGS. 3 and 4. Common to the exemplary embodiments is that the friction-fitting, form-fitting, integral and/or sprung connection is either passively or actively detachable. "Passively" means that a force acting between the coupling element 12 and the connecting element 13 and which is caused in particular by the second drive 9 and its drive movements, detaches the connection, specifically in particular when the aforesaid limiting load is exceeded. "Actively" means that the connection is detached actively as a result of the action of an additional device which is different from the second drive 9, for example by means of a pyrotechnic actuator 10, if appropriate in conjunction with a pre-tensioned spring.

In the exemplary embodiment in FIG. 3a), the coupling element 12 is connected to the connecting element 13 by a form fit. The form fit in the axial direction X is provided here by elements projecting into the interior of the connecting element 13. For example, a material projection 15 in one piece with the rest of the connecting element 13 and/or a pin 16, for example a plastic or steel pin, and/or a weld can be provided as such an element. The coupling element 13 can have cutters 17 on its side pointing in the axial direction or facing said elements, with which cutters the projecting elements can be sheared off to detach the form-fitting connection.

In the exemplary embodiment in FIG. 3b), a shear bolt 18 extending through the coupling element 12 and the connecting element 13 is provided in order to connect the coupling element 12 to the connecting element 13 with a form fit.

The exemplary embodiment in FIG. 3c) shows a form-fitting connection in which the mutually facing surfaces of the coupling element 12 and the connecting element 13 each have an uneven surface, wherein the surfaces in particular correspond to one another. In particular, laterally projecting sections, that is to say projecting transversely to the axial direction X, can be provided in the coupling element 12, interacting in a form-fitting manner with corresponding laterally depressed sections in the connecting element 13. The projecting sections 19 of the coupling element 12 here have a comparatively low lateral extent and are in particular configured as flexible crush ribs. The projecting sections 19 and the depressed sections 20 can also be provided on the respective other element 12, 13 and/or be more highly pronounced, in particular have a larger lateral extent. Thus, the coupling element 12 can also have a lateral constriction which, at the top, in particular forms a head-shaped section. Laterally projecting sections of the connecting element 13 then engage transversely relative to the axial direction X into the constriction underneath the head-shaped section of the coupling element 12 in order to provide the form-fitting connection.

FIG. 3d) shows a further exemplary embodiment with a form-fitting connection, wherein here cuts 21 are provided in the material of the connecting element 13, permitting part of the material of the connecting element 13 to bead over inward in order, as a result, once more to form appropriate projections which ensure the form fit.

In the exemplary embodiment in FIG. 3e), sliders 22 spring-loaded transversely relative to the axial direction X are provided in order to provide the form-fitting connection between the coupling element 12 and the connecting element 13.

In the exemplary embodiment according to FIG. 3f), a bolt or a screw 23, extending in the axial direction X here, is provided, connecting the coupling element 12 to the connecting element 13 by a form fit. The bolt or the screw 23 has a constriction 24 in the region between the coupling element 12 and the connecting element 13, which provides a material weakening and to this extent forms an intended fracture point. At this intended fracture point, the bolt or the screw 23 can be severed in the axial direction when a limiting load is exceeded. In principle, it is also conceivable to fill the space between the coupling element 12 and the connecting element 13, in which the intended fracture point is located, with a fuel, in particular a solid fuel, and to ignite this fuel in order to sever the bolt or the screw 23. In this case, the coupling device 11 therefore has a pyrotechnic actuator 10, which detaches the connection.

FIG. 4a) shows an exemplary embodiment in which the connection between the coupling element 12 and the connecting element 13 is a frictional connection. By way of example, here a lateral, flat contact of the coupling element 12 on the connecting element 13 is provided, here in the form of a press fit. When a limiting load is exceeded, this frictional connection is detached and the coupling element 12 is displaced relative to the connecting element 13. The coupling element 12 can also be configured and arranged relative to the connecting element 13 such that it rests on the inner side of the connecting element 13 exclusively with its edges or else with rounded surfaces. The frictional connection can then be detached, for example, by tilting the coupling element 12 within the connecting element 13.

In the exemplary embodiment in FIG. 4b), an integral connection is provided between the coupling element 12 and the connecting element 13. Here, the coupling element 12 and the connecting element 13 are integrally connected to each other via lateral material webs 25 and/or via at least one material web 26 extending in the axial direction X. Instead of the lateral material webs 25, an adhesive or binder, for example a casting resin, can also be provided in the interspace between the coupling element 12 and the connecting element 13. The same is also correspondingly true of the axial interspace between the coupling element 12 and the connecting element 13 which also, instead of the web 26, can have an adhesive or binder, for example a casting resin, in order to provide the integral connection.

FIG. 4c) shows an exemplary embodiment in which the connection between the coupling element 12 and the connecting element 13 is actively detachable, specifically by means of a pyrotechnic actuator 10, which can move a locking element 27 out of a locking position, shown in FIG. 4c), by which means a form-fitting connection between the coupling element 12 and the connecting element 13 is detached. As soon as the locking element 27 has been moved out of its locking position, a pre-tensioned spring 28 deflects the coupling element 12 in the axial direction X out of its previous position. In the state illustrated in FIG. 4c), in the axial direction X, that is to say toward the bottom, there is a form-fitting connection between the coupling element 12 and the connecting element 13, specifically via the aforesaid locking element 27. The spring 28, on the other hand, forms a sprung connection in a direction counter to the axial direction X.

In the exemplary embodiment in FIG. 4d), a pyrotechnic actuator 10 is likewise provided, but here is not used to detach any locking but actively deflects the coupling element 12, which here is frictionally connected to the connecting element 13, out of its illustrated position.

In both cases, both in FIG. 4c) and in FIG. 4d), the pyrotechnic actuator 10 is formed as a piston-cylinder arrangement 29, wherein a fuel, in particular a solid fuel, is arranged in the cylinder of the cylinder-piston arrangement 29 and, when ignited, leads to an expansion, by which means the piston of the piston-cylinder arrangement 29 is accordingly moved linearly.

It should be pointed out that individual features of the preceding exemplary embodiments can also be combined with one another.

The second drive 9, which produces the second drive movement in the second drivetrain 8, is, as already mentioned, provided in particular with a pyrotechnic actuator 10 which, as FIGS. 2a) and 2b) show, can likewise be configured as a cylinder-piston arrangement 30 and can be actuated in accordance with the same functional principle as the previously described cylinder-piston arrangement 29. The pyrotechnic actuator 10 itself can produce the drive force with which the second drive 9 carries out the second drive movement. However, the pyrotechnic actuator 10 can also merely remove a locking element (not illustrated) out of a locking position, wherein then, for example, a pre-tensioned spring, in particular a compression spring, produces the corresponding drive force of the second drive 9 when the latter relaxes and in particular expands. In principle, in an alternative exemplary embodiment the second drive 9 can also be a spindle drive.

In all the previously described exemplary embodiments, the second drive 9 has a higher adjustment speed than the first drive 6. In particular, the adjustment speed of the second drive 9 is so high that when the collision position is reached, the first drive 6 and in particular a helical compression spring of the first drive 6 has not yet transmitted any force to the flap 3. The first drive or its helical compression spring that may possibly be present therefore reacts more slowly than the second drive 9.

According to another embodiment, the first drive 6 and the second drive 9 can be operated independently of each other, such as via a common control unit 31. As an example, during the externally force actuated, in particular motor-driven, operation of the first drive 6, the second drive 9 is not also operated. Additionally or alternatively, it is such that when the second drive 9 is operated, the first drive 6 is in any case not motor operated. If the first drive 6 has a helical compression spring, it is nevertheless possible to provide for the latter to follow the movement of the flap 3 which is caused by the second drive 9 and its second drive movement.

As an example, provision is also made for the first drive 6 to affect the adjustment of the flap 3 in a different pivoting direction than the second drive 9. According to FIG. 2a), which shows the pivoting into the open position, when the first drive 6 is actuated, the flap 3 is pivoted about a pivot axis 3a which is formed by multiple joints, which are arranged on the side of the flap 3 that points toward the windshield of the motor vehicle 4, and connect the flap 3 to the body of the motor vehicle 4. On the other hand, according to FIG. 2b), which shows the pivoting into the collision position, the flap 3 is pivoted by the second drive 9 about another pivot axis 3b, which is arranged on the side of the flap 3 that points away from the windshield and may be formed by a joint which is formed by a locked motor vehicle lock 32 and a closure part 33 meshing therewith. The motor vehicle lock 32 can, for example, be arranged on the body of the motor vehicle 4 and the closure part 33 on the flap 3, or vice versa.

As FIGS. 2a) and 2b) further illustrate, the first drivetrain 5 and the second drivetrain 8 may be arranged on the same side of the flap 3 relative to the flap longitudinal direction, specifically for example both on the right-hand vehicle side. In principle, these can, however, also be provided on different or on both vehicle sides. Additionally or alternatively, provision can also be made, as is likewise illustrated in FIGS. 2a) and 2b), for the flap-side drive connections 6a, 9a of the two drives 6, 9, on the one hand, and/or the body-side drive connections 6b, 9b of the two drives 6, 9, on the other hand, each to be spaced apart from one another relative to the flap longitudinal direction (in the closing direction of the flap). The distance between the flap-side drive connections 6a and 9a is designated here by the designation a, and the distance between the body-side drive connections 6b and 9b is designated by the designation b.

According to a further teaching, a flap arrangement 2 of a motor vehicle 4 having a flap 3, such as a front hood, and at least one drive arrangement 1, according to one or more embodiments, connected to the flap is provided.

According to a further teaching, a method for operating a drive arrangement 1 according to the disclosure and/or a flap arrangement 2 according to the present disclosure may be provided, in which, in the event of a collision, the second drive 9 effects an adjustment movement of the flap 3 from the closed position in the direction of the collision position and in particular operates until in the collision position, before the first drive 6 transmits a drive force to the flap 3. As an example, the adjustment speed of the second drive 9 is so high that when the collision position is reached, the first drive 6 and in particular a helical compression spring of the first drive 6 has not yet transmitted any force to the flap 3.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

1 drive arrangement 2 flap arrangement 3 flap 4 motor vehicle 5 first drivetrain 6 first drive 7 spindle drive 8 second drivetrain 9 second drive 10 pyrotechnic actuator 11 coupling device 12 coupling element 13 coupling element 14 stop 15 material projection 16 pin 17 cutters 18 shear bolt 19 sections 20 depressed sections 21 cuts 22 sliders 23 screw 24 constriction 25 lateral material webs 26 web 26 one material web 27 locking element 28 spring 28 pre-tensioned spring 29 cylinder-piston arrangement 30 cylinder-piston arrangement 31 common control unit 32 motor vehicle lock 33 closure part 3a pivot axis 3b pivot axis 5a first strand component 5b second strand component 6a flap-side drive connection 6a drive connections 6b body-side drive connection 7a spindle unit 7b entire drive unit 9a individual flap-side drive connection 9b individual body-side drive connection While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive arrangement configured to adjust a flap for a motor vehicle, the drive arrangement comprising:
   a first drivetrain including a spindle drive, provided with a first strand component, a second strand component, a flap-side drive connection and a body-side drive connection, and configured to produce a first drive movement between the flap-side drive connection and the body-side drive connection and operate in a normal state in which the first drivetrain opens the flap from a closed position to an open position; and
   a second drivetrain including a second drive, provided with a flap-side drive connection and a body-side drive connection, and configured to produce a second drive movement between the flap-side drive connection and the body-side drive connection of the second drive, wherein the second drive movement opens the flap from the closed position to a collision position, wherein by means of the second drive movement, the first drivetrain changes from the normal state to a bypass state, in which the first strand component is displaced relative to the second strand component with respect to the normal state relative to a direction of the first drivetrain.

2. The drive arrangement of claim 1, wherein the first drive forms at least a portion of the first strand component, wherein by means of the second drive movement of the second drive the first drive is displaced from an operating position to a bypass position.

3. The drive arrangement of claim 1, wherein the second drive is a linear drive.

4. The drive arrangement of claim 1, wherein the second drive has a higher adjustment speed than an adjustment speed of the first drive.

5. The drive arrangement of claim 1, wherein the first drive and the second drive are each configured to operate independently of each other and the first drive is configured to adjust the flap in a first pivoting direction about a first pivot axis, and the second drive is configured to adjust the flap in a second pivoting direction about a second pivot axis.

6. The drive arrangement of claim 1, wherein the flap includes a first side and a second side and the first drivetrain and the second drivetrain are each arranged on the first side.

7. A method for operating the drive arrangement of claim 1, the method comprising:
   detecting a collision event; and
   actuating the second drive to move the front hood from the closed position to the collision position prior to the first drive transmitting a force to the front hood caused by the collision event.

8. The drive arrangement of claim 1, wherein the flap includes a first end and a second end and the first drivetrain is configured to move the first end away from a body of the motor vehicle and the second drivetrain is configured to move the second end away from the vehicle body.

9. The drive arrangement of claim 1, wherein the first drivetrain includes a coupling device provided with a coupling element, axially fixed and pivotably connected to either the flap-side drive connection of the first drive or the body-side drive connection of the first drive, and a connecting element configured to connect the coupling element to either the flap or a body of the motor vehicle.

10. The drive arrangement of claim 9, wherein the connecting element forms the second strand component, wherein by means of the second drive movement of the second drive, the first drive and the coupling element are displaced from an operating position to a bypass position.

11. The drive arrangement of claim 9, wherein the connecting element is axially and rotationally fixed to the flap and/or a body of the motor vehicle and the first drive is axially fixed and pivotably connected to the flap and/or the body, wherein the connecting element is configured to follow the flap as the flap moves from the closed position to the open position and from the closed position to the collision position.

12. The drive arrangement of claim 1, wherein the first drivetrain includes a coupling element forming a first strand section of the first strand component, wherein when the first drivetrain is in the normal state, the coupling element is connected by a friction fit, form fit, integral fit and/or in a sprung manner to a connecting element, and wherein when a predetermined load is exceeded, the coupling element disconnects from the connecting element so that the first drivetrain changes from the normal state to the bypass state.

13. The drive arrangement of claim 12, wherein the coupling element is mounted to an interior portion of the connecting element.

14. The drive arrangement of claim 12, wherein the coupling device includes an axial stop and the coupling element is configured to move axially with respect to the connecting element and engage the axial stop after the coupling element disconnects from the connecting element.

15. The drive arrangement of claim 12, wherein the first strand section is configured reset to move to an original position, relative to the second strand section before the coupling element disconnects from the connecting element.

16. The drive arrangement of claim 12, wherein the coupling element is configured to be reset and move to an original position relative to the connecting element before the coupling element disconnects from the connecting element.

17. The drive arrangement of claim 12, wherein the second drivetrain includes a pyrotechnic actuator configured to disconnect the coupling element from the connecting element before the coupling element disconnects from the connecting element.

18. The drive arrangement of claim 12, wherein the coupling device includes a pin and a stop and when the first drive is in the normal state, the pin is disposed between the coupling element and the stop and wherein the pin is configured to break in response to the second drive moving the flap from the closed position to the collision position.

19. The drive arrangement of claim 12, wherein the coupling element is formed by a hollow body including a protrusion configured to engage the coupling element when the first drive is in the normal state and disengage the coupling element in response to the second drive moving the flap from the closed position to the collision position.

20. A flap arrangement for use in a vehicle, the flap arrangement comprising:
    a flap;
    a coupling device;
    a first drive configured as a spindle drive disposed between the coupling device and a vehicle body or the flap and configured to move the flap between a closed position and an open position; and
    a second drive extending between the vehicle body and the flap and configured to move the flap from the closed position to a collision position and move an end of the spindle drive along the coupling device.

\* \* \* \* \*